(12) United States Patent
Tokimune et al.

(10) Patent No.: US 10,479,880 B2
(45) Date of Patent: Nov. 19, 2019

(54) RUBBER COMPOSITION FOR TIRES AND PNEUMATIC TIRE

(71) Applicants: SUMITOMO RUBBER INDUSTRIES, LTD., Kobe-shi, Hyogo (JP); SHIN-ETSU CHEMICAL CO., LTD., Tokyo (JP)

(72) Inventors: Ryuichi Tokimune, Kobe (JP); Tsuyoshi Tsuchida, Kobe (JP); Ryota Kitago, Kobe (JP); Soh Ishino, Kobe (JP); Hiroyuki Kishimoto, Kobe (JP); Munenao Hirokami, Annaka (JP); Tetsuro Yamada, Annaka (JP)

(73) Assignees: SUMITOMO RUBBER INDUSTRIES, LTD., Kobe-Shi, Hyogo (JP); SHIN-ETSU CHEMICAL CO., LTD., Tokyo (JP)

( * ) Notice: Subject to any disclaimer, the term of this patent is extended or adjusted under 35 U.S.C. 154(b) by 49 days.

(21) Appl. No.: 15/711,353

(22) Filed: Sep. 21, 2017

(65) Prior Publication Data

US 2018/0112065 A1    Apr. 26, 2018

(30) Foreign Application Priority Data

Oct. 20, 2016  (JP) ................. 2016-206403

(51) Int. Cl.
| | | |
|---|---|---|
| *C08K 5/548* | (2006.01) | |
| *C08K 5/5419* | (2006.01) | |
| *C08L 9/00* | (2006.01) | |
| *C08K 3/36* | (2006.01) | |
| *C08L 9/06* | (2006.01) | |
| *B60C 1/00* | (2006.01) | |

(52) U.S. Cl.
CPC ............... *C08K 5/548* (2013.01); *C08K 3/36* (2013.01); *C08K 5/5419* (2013.01); *C08L 9/00* (2013.01); *C08L 9/06* (2013.01); *B60C 1/00* (2013.01)

(58) Field of Classification Search
CPC ............ C08K 5/548; C08K 5/519; C08L 9/00
USPC ......................................................... 524/262
See application file for complete search history.

(56) References Cited

U.S. PATENT DOCUMENTS

| | | |
|---|---|---|
| 5,620,939 A | 4/1997 | Halasa et al. |
| 5,994,448 A | 11/1999 | Blok et al. |
| 2004/0020576 A1* | 2/2004 | Frank .................. B60C 1/00 152/450 |
| 2006/0060285 A1* | 3/2006 | Weydert ............... B60C 1/0016 524/262 |
| 2012/0053262 A1 | 3/2012 | Chen |

FOREIGN PATENT DOCUMENTS

| | | |
|---|---|---|
| EP | 0994149 A1 | 4/2000 |
| JP | 4265248 B2 | 5/2009 |
| WO | WO 2016/105932 A1 | 6/2016 |

* cited by examiner

*Primary Examiner* — Deve V Hall
(74) *Attorney, Agent, or Firm* — Birch, Stewart, Kolasch & Birch LLP

(57) ABSTRACT

Provided are a rubber composition for tires which achieves both abrasion resistance and processability while maintaining fuel economy, and a pneumatic tire including the rubber composition. A rubber composition for tires, containing an organosilicon compound represented by the average compositional formula (I) below having a ratio of the number of sulfur atoms to the number of silicon atoms of 1.0 to 1.5, $$\begin{array}{c}R^2\ R^1\\ \diagdown\ |\\ Si{-}(CH_2)_{\overline{m}}{-}S_x{-}(CH_2)_{\overline{m}}{-}Si{-}R^5\\ /\qquad\qquad\qquad\qquad\qquad \diagdown\\ R^3\qquad\qquad\qquad\qquad\qquad R^6\end{array} \quad (I)$$

wherein x represents the average number of sulfur atoms; m represents an integer of 6 to 12; and $R^1$ to $R^6$ are the same or different and each represent a C1-C6 alkyl or alkoxy group, at least one of $R^1$ to $R^3$ and at least one of $R^4$ to $R^6$ are the alkoxy groups, and two or more of the alkyl or alkoxy groups for $R^1$ to $R^6$ may be joined to form a ring.

3 Claims, No Drawings

RUBBER COMPOSITION FOR TIRES AND PNEUMATIC TIRE

TECHNICAL FIELD

The present invention relates to a rubber composition for tires and a pneumatic tire including the rubber composition.

BACKGROUND ART

The recent demand for safe and fuel efficient automobiles has created a need for tire rubber materials to achieve a simultaneous improvement in wet-skid properties, fuel economy, and abrasion resistance. However, since these properties have a trade-off relationship, it is usually difficult to achieve a balanced improvement of these properties.

Silica (filler for reducing heat build-up) has been used to solve this problem. However, silica particles tend to aggregate due to the hydrogen bonding of silanol functional groups on the surface, they insufficiently disperse, causing problems such as poor processability.

In this context, techniques using silane coupling agents have been developed to improve dispersion of silica. For example, Patent Literature 1 proposes to use silane coupling agents such as bis(3-triethoxysilylpropyl)tetrasulfide. However, despite the use of such general purpose silane coupling agents, there is a need for further improvement to achieve high degrees of processability and abrasion resistance.

CITATION LIST

Patent Literature

Patent Literature 1: JP 4266248 B

SUMMARY OF INVENTION

Technical Problem

The present invention aims to solve the problem and provide a rubber composition for tires which achieves both abrasion resistance and processability while maintaining fuel economy, and a pneumatic tire including the rubber composition.

Solution to Problem

The present invention relates to a rubber composition for tires, containing an organosilicon compound represented by average compositional formula (I) below having a ratio of the number of sulfur atoms to the number of silicon atoms of 1.0 to 1.5,

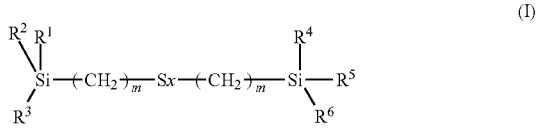

wherein x represents the average number of sulfur atoms; m represents an integer of 6 to 12; and $R^1$ to $R^6$ are the same or different and each represent a C1-C6 alkyl or alkoxy group, at least one of $R^1$ to $R^3$ and at least one of $R^4$ to $R^6$ are the alkoxy groups, and two or more of the alkyl or alkoxy groups for $R^1$ to $R^6$ may be joined to form a ring.

Preferably, the rubber composition contains: a diene rubber; an inorganic filler in an amount of 5 to 150 parts by mass per 100 parts by mass of the diene rubber; and the organosilicon compound in an amount of 0.5 to 15 parts by mass per 100 parts by mass of the inorganic filler.

The inorganic filler preferably has a silica content of 90% by mass or more.

The present invention also relates to a pneumatic tire, formed from the rubber composition.

Advantageous Effects of Invention

The rubber composition for tires of the present invention contains an organosilicon compound represented by average compositional formula (I) having a ratio of the number of sulfur atoms to the number of silicon atoms of 1.0 to 1.5. With such a rubber composition, it is possible to achieve both abrasion resistance and processability while maintaining fuel economy.

DESCRIPTION OF EMBODIMENTS

The rubber composition for tires of the present invention contains an organosilicon compound represented by the average compositional formula (I) below having a ratio of the number of sulfur atoms to the number of silicon atoms of 1.0 to 1.5,

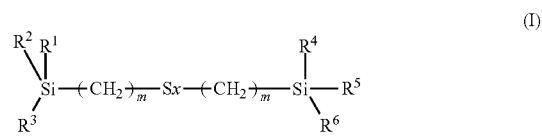

wherein x represents the average number of sulfur atoms; m represents an integer of 6 to 12; and $R^1$ to $R^6$ are the same or different and each represent a C1-C6 alkyl or alkoxy group, at least one of $R^1$ to $R^3$ and at least one of $R^4$ to $R^6$ are the alkoxy groups, and two or more of the alkyl or alkoxy groups for $R^1$ to $R^6$ may be joined to form a ring.

The present inventors have found that when the organosilicon compound of formula (I) as a silane coupling agent is incorporated into a diene rubber composition containing an inorganic filler, the rubber composition shows good fuel economy (less heat build-up) and further a balanced improvement in fuel economy, processability, which is usually a drawback of silica-containing formulations, and abrasion resistance, which conflicts with fuel economy.

The reason for this effect is not absolutely clear but seems to be as follows.

Organosilicon compounds (silane coupling agents) cause crosslinking between silica and rubber. The length of the bond between silica and rubber is longer particularly when the compound of formula (I) having 6 to 12 carbon atoms between a sulfur atom and a silicon atom is used as a silane coupling agent than when common silane coupling agents are used. It is then considered that a certain degree of flexibility is imparted to the crosslinked portions, which facilitates relaxation of external stress which can cause rubber breakage. Presumably for this reason, the organosilicon compound improves abrasion resistance better than common silane coupling agents. It also seems that due to the larger number of carbon atoms between silicon and sulfur than in common silane coupling agents, the organosilicon compound has a slightly reduced rate of silanization, thereby reducing excessive bonding between silica and rubber during kneading, with the result that good processability is also provided. It is therefore possible to achieve both processability and abrasion resistance while maintaining good fuel economy, thereby achieving a balanced improvement of these properties.

The symbol x represents the average number of sulfur atoms of the organosilicon compound. This means that the organosilicon compound of average compositional formula (I) is a mixture of compounds having different sulfur numbers, and x is the average number of sulfur atoms of the organosilicon compounds present in the rubber composition. The symbol x is defined as {2×(the number of sulfur atoms)}/(the number of silicon atoms). In view of the balance of fuel economy, abrasion resistance, and processability, x is preferably 2.0 to 2.4, more preferably 2.0 to 2.3. Particularly when x is lower than the upper limit, an increase in the Mooney viscosity of the unvulcanized rubber can be reduced, thereby resulting in good processability. The number of sulfur atoms and the number of silicon atoms are determined by measuring the amounts of sulfur and silicon, respectively, in the composition by X-ray fluorescence analysis and converting them based on the respective molecular weights.

The symbol m represents an integer of 6 to 12, preferably 6 to 10, more preferably 8. In this case, the above-described effects can be achieved, and therefore the effects of the present invention can be sufficiently achieved.

A larger number of carbon atoms in the alkyl group ($R^1$ to $R^6$) tends to lead to more inhibition of silanization. In this case, processability is improved, while fuel economy, reinforcing properties, abrasion resistance, or other properties may deteriorate due to the insufficient silanization.

In view of the balance of the properties, the alkyl group ($R^1$ to $R^6$) preferably has 1 to 6 carbon atoms, more preferably 1 to 4 carbon atoms. The alkyl group may be linear, branched, or cyclic. Specific examples include methyl, ethyl, n-propyl, isopropyl, n-butyl, iso-butyl, sec-butyl, and tert-butyl groups.

A larger number of carbon atoms in the alkoxy group ($R^1$ to $R^6$) tends to lead to more inhibition of silanization. In this case, processability is improved, while fuel economy, reinforcing properties, abrasion resistance, or other properties may deteriorate due to the insufficient silanization.

In view of the balance of the properties, the alkoxy group ($R^1$ to $R^6$) preferably has 1 to 6 carbon atoms, more preferably 1 to 4 carbon atoms. The hydrocarbon group in the alkoxy group may be linear, branched, or cyclic. Specific examples include methoxy, ethoxy, n-propoxy, isopropoxy, and n-butoxy groups.

A larger number of carbon atoms in the alkyl or alkoxy group ($R^1$ to $R^6$) tends to lead to more inhibition of silanization. In this case, processability is improved, while fuel economy, reinforcing properties, abrasion resistance, or other properties may deteriorate due to the insufficient silanization.

At least one of $R^1$ to $R^3$ and at least one of $R^4$ to $R^6$ are C1-C6 alkoxy groups, and preferably two or more of $R^1$ to $R^3$ and two or more of $R^4$ to $R^6$ are C1-C6 alkoxy groups.

Two or more of the C1-C6 alkyl or alkoxy groups for $R^1$ to $R^6$ may be joined to form a ring. For example, (i) when an ethoxy group as $R^1$ is joined to a methyl group as $R^2$ to form a ring, and (ii) when an ethyl group as $R^1$ is joined to a methyl group as $R^2$ to form a ring, $R^1$ and $R^2$ form the divalent groups: "—O—$C_2H_4$—$CH_2$—" and "—$C_2H_4$—$CH_2$—", respectively, which are joined to Si.

The organosilicon compound has a ratio of the number of sulfur atoms to the number of silicon atoms of 1.0 to 1.5. That is, the organosilicon compounds of average compositional formula (I) present in the rubber composition have a ratio of the total number of sulfur atoms to the total number of silicon atoms falling within the above range.

In view of the balance of fuel economy, abrasion resistance, and processability, the ratio of the number of sulfur atoms to the number of silicon atoms is preferably 1.0 to 1.2, more preferably 1.0 to 1.15.

The amount of the organosilicon compound per 100 parts by mass of the inorganic filler described later is preferably 0.5 parts by mass or more, more preferably 4 parts by mass or more, still more preferably 6 parts by mass or more. When the amount is 0.5 parts by mass or more, a sufficient amount of chemical bonds between rubber and silica via the organosilicon compound (silane coupling agent) can be formed to provide good dispersion of silica, resulting in improved fuel economy and abrasion resistance. The amount of the organosilicon compound is preferably 15 parts by mass or less, more preferably 12 parts by mass or less, still more preferably 10 parts by mass or less. When the amount is 15 parts by mass or less, good processability can be ensured.

The organosilicon compound of average compositional formula (I) having a ratio of the number of sulfur atoms to the number of silicon atoms falling within the predetermined range can be produced, for example, as follows.

The organosilicon compound can be produced by reacting a halogen-containing organosilicon compound represented by the following formula (I-1):

(I-1)

wherein $R^1$ to $R^3$ and m are as defined above, and X represents a halogen atom, with anhydrous sodium sulfide represented by $Na_2S$ and optionally sulfur.

Examples of X (halogen atom) include Cl, Br, and I.

Examples of compounds that may be used as the sulfide chain-containing organosilicon compound of average compositional formula (I) include the following compounds.

$(CH_3O)_3Si—(CH_2)_6—S_1—(CH_2)_6—Si(OCH_3)_3$
$(CH_3O)_3Si—(CH_2)_6—S_2—(CH_2)_6—Si(OCH_3)_3$
$(CH_3O)_3Si—(CH_2)_6—S_3—(CH_2)_6—Si(OCH_3)_3$
$(CH_3CH_2O)_3Si—(CH_2)_6—S_1—(CH_2)_6—Si(OCH_2CH_3)_3$
$(CH_3CH_2O)_3Si—(CH_2)_6—S_2—(CH_2)_6—Si(OCH_2CH_3)_3$
$(CH_3CH_2O)_3Si—(CH_2)_6—S_3—(CH_2)_6—Si(OCH_2CH_3)_3$
$(CH_3CH_2O)_2(CH_3)Si—(CH_2)_6—S_2—(CH_2)_6—Si(CH_3)(OCH_2CH_3)_2$
$CH_3CH_2O(CH_3)_2Si—(CH_2)_6—S_2—(CH_2)_6—Si(CH_3)_2OCH_2CH_3$
$(CH_3O)_3Si—(CH_2)_8—S_1—(CH_2)_8—Si(OCH_3)_3$
$(CH_3O)_3Si—(CH_2)_8—S_2—(CH_2)_8—Si(OCH_3)_3$
$(CH_3O)_3Si—(CH_2)_8—S_3—(CH_2)_8—Si(OCH_3)_3$
$(CH_3CH_2O)_3Si—(CH_2)_8—S_1—(CH_2)_8—Si(OCH_2CH_3)_3$
$(CH_3CH_2O)_3Si—(CH_2)_8—S_2—(CH_2)_8—Si(OCH_2CH_3)_3$
$(CH_3CH_2O)_3Si—(CH_2)_8—S_3—(CH_2)_8—Si(OCH_2CH_3)_3$
$(CH_3CH_2O)_2(CH_3)Si—(CH_2)_8—S_2—(CH_2)_8—Si(CH_3)(OCH_2CH_3)_2$
$CH_3CH_2O(CH_3)_2Si—(CH_2)_8—S_2—(CH_2)_8—Si(CH_3)_2OCH_2CH_3$
$(CH_3O)_3Si—(CH_2)_{11}—S_1—(CH_2)_{11}—Si(OCH_3)_3$ (CH₃O)₃Si—(CH₂)₁₁—S₂—(CH₂)₁₁—Si(OCH₃)₃
(CH₃O)₃Si—(CH₂)₁₁—S₃—(CH₂)₁₁—Si(OCH₃)₃
(CH₃CH₂O)₃Si—(CH₂)₁₁—S₁—(CH₂)₁₁—Si(OCH₂CH₃)₃
(CH₃CH₂O)₃Si—(CH₂)₁₁—S₂—(CH₂)₁₁—Si(OCH₂CH₃)₃
(CH₃CH₂O)₃Si—(CH₂)₁₁—S₃—(CH₂)₁₁—Si(OCH₂CH₃)₃
(CH₃CH₂O)₂(CH₃)Si—(CH₂)₁₁—S₂—(CH₂)₁₁—Si(CH₃)(OCH₂CH₃)₂
CH₃CH₂O(CH₃)₂Si—(CH₂)₁₁—S₂—(CH₂)₁₁—Si(CH₃)₂OCH₂CH₃

Examples of the halogen-containing organosilicon compound of formula (I-1) include the following compounds.
(CH₃O)₃Si—(CH₂)₆—Cl
(CH₃O)₃Si—(CH₂)₆—Br
(CH₃CH₂O)₃Si—(CH₂)₆—Cl
(CH₃CH₂O)₃Si—(CH₂)₆—Br
(CH₃CH₂O)₂(CH₃)Si—(CH₂)₆—Cl
CH₃CH₂O(CH₃)₂Si—(CH₂)₆—Cl
(CH₃O)₃Si—(CH₂)₈—Cl
(CH₃O)₃Si—(CH₂)₈—Br
(CH₃CH₂O)₃Si—(CH₂)₈—Cl
(CH₃CH₂O)₃Si—(CH₂)₈—Br
(CH₃CH₂O)₂(CH₃)Si—(CH₂)₈—Cl
CH₃CH₂O(CH₃)₂Si—(CH₂)₈—Cl
(CH₃O)₃Si—(CH₂)₁₁—Cl
(CH₃O)₃Si—(CH₂)₁₁—Br
(CH₃CH₂O)₃Si—(CH₂)₁₁—Cl
(CH₃CH₂O)₃Si—(CH₂)₁₁—Br
(CH₃CH₂O)₂(CH₃)Si—(CH₂)₁₁—Cl
CH₃CH₂O(CH₃)₂Si—(CH₂)₁₁—Cl In the reaction, sulfur may optionally be added to control the sulfide chain. The amount of sulfur to be added may be determined from the amounts of the compound of average compositional formula (I-1) and anhydrous sodium sulfide to give a target compound of average compositional formula (I).

For example, when a compound of average compositional formula (I) wherein x is 2.2 is desired, it may be produced by reacting 1.0 mol of anhydrous sodium sulfide, 1.2 mol of sulfur, and 2.0 mol of the compound of formula (I-1).

The reaction may be carried out using any solvent or no solvent. Examples of solvents that can be used include aliphatic hydrocarbons such as pentane and hexane; aromatic hydrocarbons such as benzene, toluene, and xylene; ethers such as tetrahydrofuran, diethyl ether, and dibutyl ether; and alcohols such as methanol and ethanol. The reaction is preferably carried out particularly using an ether such as tetrahydrofuran or an alcohol such as methanol or ethanol.

The temperature during the reaction is not particularly limited and may range from room temperature to about 200° C., in particular preferably 60° C. to 170° C., more preferably 60° C. to 100° C. The duration of the reaction is 30 minutes or longer although the reaction will be completed in about 2 to 15 hours.

In the present invention, the solvent, if used, may be evaporated off under reduced pressure before or after the resulting salts are removed by filtration after completion of the reaction.

The rubber composition of the present invention may contain a diene rubber, an inorganic filler, and the organosilicon compound.

Examples of the diene rubber include isoprene-based rubbers, polybutadiene rubber (BR), styrene butadiene rubber (SBR), styrene isoprene butadiene rubber (SIBR), chloroprene rubber (CR), acrylonitrile butadiene rubber (NBR), and butyl rubber (IIR). Examples of isoprene-based rubbers include natural rubber (NR), polyisoprene rubber (IR), purified NR (e.g. deproteinized natural rubber (DPNR), ultra pure natural rubber (UPNR)), modified NR (e.g. epoxidized natural rubber (ENR), hydrogenated natural rubber (HNR), grafted natural rubber), and modified IR (e.g. epoxidized polyisoprene rubber, hydrogenated polyisoprene rubber, grafted polyisoprene rubber). These diene rubbers may be used alone, or two or more of these may be used in combination. Among these, SBR, isoprene-based rubbers, and BR are preferred to suitably achieve the effects of the present invention.

Any SBR may be used, including emulsion-polymerized SBR (E-SBR) and solution-polymerized SBR (S-SBR). Examples of NR include SIR20, RSS#3, and TSR20. Any BR may be used, including high-cis 1,4-polypolybutadiene rubber (high-cis BR), polybutadiene rubber containing 1,2-syndiotactic polybutadiene crystals (SPB-containing BR), and BR synthesized using rare earth catalysts (rare earth-catalyzed BR). The SBR and BR may be modified SBR and modified BR, respectively, in which either the main chain or chain end(s) or both may be modified. Examples of modifying groups that can be used include nitrogen-containing groups interactive or reactive with silica.

The rubber composition of the present invention preferably contains an inorganic filler. Examples of the inorganic filler include silica, calcium carbonate, calcium silicate, magnesium oxide, aluminum oxide, alumina, alumina hydrate, aluminum hydroxide, magnesium hydroxide, magnesium oxide, barium sulfate, talc, and mica. Among these, silica is preferred to obtain a good balance between fuel economy and grip performance.

Any silica may be used, and examples include dry silica (anhydrous silicic acid) and wet silica (hydrous silicic acid). Wet silica is preferred because it contains a large number of silanol groups.

The silica preferably has a nitrogen adsorption specific surface area ($N_2SA$) of 70 m²/g or more, more preferably 150 m²/g or more. When the $N_2SA$ is 70 m²/g or more, abrasion resistance and other properties tend to be improved. The $N_2SA$ of the silica is preferably 500 m²/g or less, more preferably 200 m²/g or less. When the $N_2SA$ is 500 m²/g or less, processability tends to be improved.

The nitrogen adsorption specific surface area of the silica is determined by the BET method in accordance with ASTM D3037-81.

The amount of the inorganic filler (e.g. silica) per 100 parts by mass of the diene rubber is preferably 5 parts by mass or more, more preferably 10 parts by mass or more, still more preferably 20 parts by mass or more. When the amount is 5 parts by mass or more, fuel economy and other properties tend to be improved. The amount of the inorganic filler is preferably 150 parts by mass or less, more preferably 100 parts by mass or less, still more preferably 90 parts by mass or less. When the amount is more than 150 parts by mass, the balance between processability and fuel economy tends to deteriorate.

The amount of silica based on 100% by mass of the inorganic filler in the rubber composition of the present invention is preferably 90% by mass or more, more preferably 95% by mass or more, and may be 100% by mass. When the inorganic filler includes a large amount of silica, good abrasion resistance and good fuel economy can be obtained.

The rubber composition of the present invention preferably contains carbon black. This can provide good abrasion resistance and good processability, so that the effects of the present invention can be sufficiently achieved.

The amount of carbon black per 100 parts by mass of the diene rubber is preferably 2 parts by mass or more, more preferably 5 parts by mass or more. When the amount is 2 parts by mass or more, abrasion resistance and other properties tend to be improved. The amount of carbon black is preferably 80 parts by mass or less. When the amount is 80 parts by mass or less, good fuel economy tends to be obtained.

In addition to the above-mentioned components, the rubber composition of the present invention may appropriately contain other compounding agents commonly used for preparation of rubber compositions, such as zinc oxide, stearic acid, various types of antioxidants, softeners such as oils, waxes, vulcanizing agents such as sulfur, and vulcanization accelerators.

The rubber composition of the present invention may be prepared by known methods. For example, the rubber composition may be prepared by kneading the above-mentioned components using a rubber kneading machine such as an open roll mill or a Banbury mixer and vulcanizing the kneaded mixture.

The rubber composition of the present invention can be suitably used in tire components, including sidewalls, treads (cap treads), base treads, undertreads, clinch apexes, bead apexes, breaker cushion rubbers, rubbers for carcass cord toppings, insulations, chafers, and innerliners; and side reinforcing layers of run-flat tires. The rubber composition can be particularly suitably used in treads (cap treads) because of its good fuel economy and good abrasion resistance.

The pneumatic tire of the present invention can be produced using the rubber composition by conventional methods. Specifically, the unvulcanized rubber composition incorporating various additives as needed is extruded into the shape of a tire component such as a tread and then formed and assembled with other tire components in a conventional manner on a tire building machine to build an unvulcanized tire. The unvulcanized tire is heat pressed in a vulcanizer to produce a tire.

The tire of the present invention can be suitably used as a tire for passenger vehicles, buses, trucks, or two-wheeled vehicles, and as a high performance tire, a racing tire, or other tires.

EXAMPLES

The present invention is specifically described with reference to, but not limited to, examples below.

Hereinbelow, the amounts of sulfur and silicon in each compound were determined by X-ray fluorescence analysis, specifically as follows. An amount of 0.1 g of each reaction product obtained in the production examples below was weighed and diluted with 5 mL of toluene. To the dilution was added 300 μL of an internal standard solution prepared by diluting 8 g of 3-mercaptopropyltriethoxysilane with 20 mL of toluene. The mixture was placed in a polyethylene film cup for liquid and then subjected to X-ray fluorescence analysis to determine the amounts of sulfur and silicon in the compound by an internal standard method.

Production Example 1: Synthesis of Silane Compound 1 (x=2.2, m=8, $R^1$ to $R^6$=$OCH_2CH_3$)

A 2 L separable flask equipped with a stirrer, a reflux condenser, a dropping funnel, and a thermometer was charged with 78.0 g (1.0 mol) of anhydrous sodium sulfide, 38.5 g (1.2 mol) of sulfur, and 480 g of ethanol, followed by heating to 80° C. To the resulting mixture was dropwise added 622 g (2.0 mol) of 8-chlorooctyltriethoxysilane, and the mixture was heated with stirring at 80° C. for 10 hours. The reaction solution was subjected to pressure filtration using a filter plate to obtain a filtrate from which salts formed through the reaction were removed. The filtrate was heated to 100° C., and the ethanol was evaporated off under a reduced pressure of 10 mmHg or lower to obtain silane compound 1 as a reaction product.

The silane compound 1 had a sulfur content of 10.8% by mass (0.34 mol), a silicon content of 8.7% by mass (0.31 mol), and a ratio of the number of sulfur atoms to the number of silicon atoms of 1.1.

Production Example 2: Synthesis of Silane Compound 2 (x=2.0, m=8, $R^1$ to $R^6$=$OCH_2CH_3$)

Silane compound 2 was obtained as a reaction product by the same synthesis procedure as in Production Example 1, except that the amount of sulfur was changed to 32.1 g (1.0 mol).

The silane compound 2 had a sulfur content of 10.0% by mass (0.31 mol), a silicon content of 8.8% by mass (0.31 mol), and a ratio of the number of sulfur atoms to the number of silicon atoms of 1.0.

Production Example 3: Synthesis of Silane Compound 3 (x=2.4, m=8, $R^1$ to $R^6$=$OCH_2CH_3$)

Silane compound 3 was obtained as a reaction product by the same synthesis procedure as in Production Example 1, except that the amount of sulfur was changed to 45.0 g (1.4 mol).

The silane compound 3 had a sulfur content of 11.9% by mass (0.37 mol), a silicon content of 8.7% by mass (0.31 mol), and a ratio of the number of sulfur atoms to the number of silicon atoms of 1.2.

Production Example 4: Synthesis of Silane Compound 4 (x=2.2, m=8, $R^1$, $R^2$, $R^4$, $R^5$=$OCH_2CH_3$, $R^3$, $R^6$=$CH_3$)

Silane compound 4 was obtained as a reaction product by the same synthesis procedure as in Production Example 1, except that 562 g (2.0 mol) of 8-chlorooctyldiethoxymethylsilane was used instead of 8-chlorooctyltriethoxysilane.

The silane compound 4 had a sulfur content of 11.0% by mass (0.34 mol), a silicon content of 8.7% by mass (0.31 mol), and a ratio of the number of sulfur atoms to the number of silicon atoms of 1.1.

The chemicals used in examples and comparative examples are listed below.
  SBR: SBR1502 available from Zeon Corporation
  BR: Ubepol BR150B available from Ube Industries, Ltd.
  NR: RSS#3
  Carbon black: DIABLACK N220 ($N_2$SA: 111 $m^2$/g, DBP absorption: 115 mL/100 g) available from Mitsubishi Chemical Corporation
  Silica: ULTRASIL VN3 ($N_2$SA: 175 $m^2$/g) available from Degussa
  Silane compound 1: see Production Example 1
  Silane compound 2: see Production Example 2
  Silane compound 3: see Production Example 3
  Silane compound 4: see Production Example 4
  Silane compound 5: Si266 (a compound represented by the following formula where x=2.2) available from Evonik Degussa

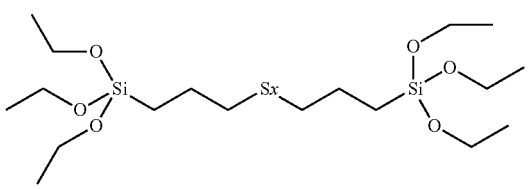

Oil: X-140 available from JX Nippon Oil & Energy Corporation

Wax: Sunnoc N available from Ouchi Shinko Chemical Industrial Co., Ltd.

Antioxidant: Antigene 3C available from Sumitomo Chemical Co., Ltd.

Stearic acid: stearic acid beads "TSUBAKI" available from NOF Corporation

Zinc oxide: Zinc oxide #1 available from Mitsui Mining & Smelting Co., Ltd.

Sulfur: powdered sulfur available form Tsurumi Chemical Industry Co., Ltd.

Vulcanization accelerator CBS: NOCCELER CZ (N-cyclohexyl-2-benzothiazolylsulfenamide) available from Ouchi Shinko Chemical Industrial Co., Ltd.

Vulcanization accelerator DPG: NOCCELER D (N,N'-diphenylguanidine) available from Ouchi Shinko Chemical Industrial Co., Ltd.

Vulcanization accelerator TBBS: NOCCELER NS (N-tert-butyl-2-benzothiazolylsulfenamide) available from Ouchi Shinko Chemical Industrial Co., Ltd.

Examples and Comparative Examples

According to each of the formulations shown in Tables 1 to 3, the materials other than sulfur and vulcanization accelerators were kneaded for three minutes at 160° C. in a 1.7 L Banbury mixer to give a kneaded mixture. The sulfur and vulcanization accelerators were then added to the kneaded mixture, followed by kneading for three minutes at 80° C. in an open roll mill to obtain an unvulcanized rubber composition.

Then, the unvulcanized rubber composition was press-vulcanized for 15 minutes at 170° C. to obtain a vulcanized rubber composition.

The unvulcanized rubber compositions and vulcanized rubber compositions prepared as above were evaluated as follows. Tables 1 to 3 show the results.

(Processability (Mooney Viscosity))

The Mooney viscosity ($ML_{1+4}$) of each unvulcanized rubber composition was measured at 130° C. using MV 202 (Shimadzu Corporation) in accordance with JIS K 6301. The Mooney viscosity (130° C.) of each formulation example is expressed as an index using the equation below, with Comparative Example 1, 2, or 3 set equal to 100. A higher index indicates better processability.

(Mooney viscosity index)=(Mooney viscosity of Comparative Example 1, 2, or 3)/(Mooney viscosity of each formulation example)×100

(Rubber Sheet Texture (Appearance of Kneaded Compound))

Each unvulcanized rubber composition was extruded into a rubber sheet. The surface appearance of the rubber sheet was visually observed and evaluated based on the criteria below. A better sheet appearance indicates better appearance of the compound.

Excellent: Glossy
Good: Very flat
Acceptable: Slightly rough
Poor: Rough (Fuel Economy (Viscoelasticity Test))

Specimens of a predetermined size were cut out of each vulcanized rubber composition. The loss tangent (tan δ) at 50° C. of the vulcanized rubber sheets was measured at an initial strain of 10%, a dynamic strain of 2%, and a frequency of 10 Hz using a viscoelasticity spectrometer (Ueshima Seisakusho Co., Ltd.). The tan δ (50° C.) of each formulation example is expressed as an index using the following equation. A higher index indicates better fuel economy.

(Rolling resistance index)=(tan δ of Comparative Example 1, 2, or 3)/(tan δ of each formulation example)×100

(Abrasion Resistance)

The Lambourn abrasion loss of each vulcanized rubber composition was measured using a Lambourn abrasion tester at a temperature 20° C. and a slip ratio of 20% for a test duration of two minutes. A volume loss was calculated from the Lambourn abrasion loss. The volume loss of each formulation example is expressed as an index using the following equation. A higher index indicates better abrasion resistance.

(Lambourn abrasion index)=(Volume loss of Comparative Example 1, 2, or 3)/(Volume loss of each formulation example)×100

TABLE 1

| | | Example | | | | | | | Comparative Example |
|---|---|---|---|---|---|---|---|---|---|
| | | 1 | 2 | 3 | 4 | 5 | 6 | 7 | 1 |
| Amount (parts by mass) | SBR | 75 | 75 | 75 | 75 | 75 | 75 | 75 | 75 |
| | BR | 25 | 25 | 25 | 25 | 25 | 25 | 25 | 25 |
| | Carbon black | 5 | 5 | 5 | 5 | 5 | 5 | 5 | 5 |
| | Silica | 70 | 70 | 70 | 70 | 70 | 70 | 70 | 70 |
| | Silane compound 1 (x = 2.2, m = 8, R1-R6 = OEt, S/Si = 1.1) | 10.5 | 3.8 | 0.7 | 7.6 | — | — | — | — |
| | Silane compound 2 (x = 2.0, m = 8, R1-R6 = OEt, S/Si = 1.0) | — | — | — | — | 7.6 | — | — | — |
| | Silane compound 3 (x = 2.4, m = 8, R1-R6 = OEt, S/Si = 1.2) | — | — | — | — | — | 7.6 | — | — |
| | Silane compound 4 (x = 2.2, m = 8, R1, R2, R4, R5 = OEt, R3, R6 = $CH_3$, S/Si = 1.1) | — | — | — | — | — | — | 7.6 | — |
| | Silane compound 5 (Si266) | — | 2.8 | 5.0 | — | — | — | — | 5.6 |

TABLE 1-continued

|  |  | Example | | | | | | | Comparative Example |
|---|---|---|---|---|---|---|---|---|---|
|  |  | 1 | 2 | 3 | 4 | 5 | 6 | 7 | 1 |
|  | Oil | 20 | 20 | 20 | 20 | 20 | 20 | 20 | 20 |
|  | Wax | 2.5 | 2.5 | 2.5 | 2.5 | 2.5 | 2.5 | 2.5 | 2.5 |
|  | Antioxidant | 2.5 | 2.5 | 2.5 | 2.5 | 2.5 | 2.5 | 2.5 | 2.5 |
|  | Stearic acid | 2 | 2 | 2 | 2 | 2 | 2 | 2 | 2 |
|  | Zinc oxide | 3 | 3 | 3 | 3 | 3 | 3 | 3 | 3 |
|  | Sulfur | 1.3 | 1.5 | 1.5 | 1.4 | 1.4 | 1.3 | 1.4 | 1.5 |
|  | Vulcanization accelerator CBS | 1.7 | 1.7 | 1.7 | 1.7 | 1.7 | 1.7 | 1.7 | 1.7 |
|  | Vulcanization accelerator DPG | 2.0 | 2.0 | 2.0 | 2.0 | 2.0 | 2.0 | 2.0 | 2.0 |
| Evaluation result | Mooney viscosity index | 112 | 108 | 102 | 113 | 112 | 110 | 112 | 100 |
|  | Appearance of kneaded compound | Excellent | Good | Acceptable | Good | Good | Good | Good | Acceptable |
|  | Rolling resistance index | 95 | 98 | 101 | 97 | 97 | 97 | 96 | 100 |
|  | Abrasion resistance index | 107 | 105 | 103 | 108 | 106 | 107 | 105 | 100 |

TABLE 2

|  |  | Example 8 | Comparative Example 2 |
|---|---|---|---|
| Amount (parts by mass) | SBR | 70 | 70 |
|  | BR | 20 | 20 |
|  | NR | 10 | 10 |
|  | Carbon black | 60 | 60 |
|  | Silica | 10 | 10 |
|  | Silane compound 1 (x = 2.2, m = 8, R1 – R6 = OEt, S/Si = 1.1) | 1.4 | — |
|  | Silane compound 5 (Si266) | — | 1.0 |
|  | Oil | 16 | 16 |
|  | Wax | 2.0 | 2.0 |
|  | Antioxidant | 2.0 | 2.0 |
|  | Stearic acid | 3 | 3 |
|  | Zinc oxide | 3 | 3 |
|  | Sulfur | 1.6 | 1.6 |
|  | Vulcanization accelerator TBBS | 2.1 | 2.1 |
| Evaluation result | Mooney viscosity index | 103 | 100 |
|  | Appearance of kneaded compound | Good | Good |
|  | Rolling resistance index | 100 | 100 |
|  | Abrasion resistance index | 102 | 100 |

TABLE 3

|  |  | Example 9 | Comparative Example 3 |
|---|---|---|---|
| Amount (parts by mass) | SBR | 70 | 70 |
|  | BR | 15 | 15 |
|  | NR | 15 | 15 |
|  | Carbon black | 5 | 5 |
|  | Silica | 100 | 100 |
|  | Silane compound 3 (x = 2.4, m = 8, R1 – R6 = OEt, S/Si = 1.2) | 10.8 | — |
|  | Silane compound 5 (Si266) | — | 8.0 |
|  | Oil | 24 | 24 |
|  | Wax | 2.0 | 2.0 |
|  | Antioxidant | 2.0 | 2.0 |
|  | Stearic acid | 3 | 3 |
|  | Zinc oxide | 3 | 3 |
|  | Sulfur | 1.7 | 1.7 |
|  | Vulcanization accelerator CBS | 1.8 | 1.8 |
|  | Vulcanization accelerator DPG | 2.0 | 2.0 |
| Evaluation result | Mooney viscosity index | 113 | 100 |
|  | Appearance of kneaded compound | Good | Poor |
|  | Rolling resistance index | 98 | 100 |
|  | Abrasion resistance index | 109 | 100 |

As demonstrated in Tables 1 to 3, the rubber compositions of the examples containing an organosilicon compound of average compositional formula (I) having a ratio of the number of sulfur atoms to the number of silicon atoms of 1.0 to 1.5 exhibited improved processability and improved abrasion resistance while maintaining good fuel economy (rolling resistance index), thereby achieving a significantly improved balance of these properties, as compared to the comparative examples using Si266.

The invention claimed is:

1. A pneumatic tire, formed from a rubber composition for tires, the rubber composition comprising an organosilicon compound represented by average compositional formula (I) below having a ratio of the number of sulfur atoms to the number of silicon atoms of 1.1 to 1.2,

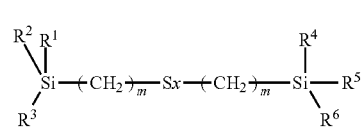

(I)

wherein x represents the average number of sulfur atoms; m represents an integer of 6 to 12; and $R^1$ to $R^6$ are the same or different and each represent a C1-C6 alkyl or alkoxy group, at least one of $R^1$ to $R^3$ and at least one of $R^4$ to $R^6$ are the alkoxy groups, and two or more of the alkyl or alkoxy groups for $R^1$ to $R^6$ may be joined to form a ring.

2. The pneumatic tire according to claim 1, wherein the rubber composition comprises:

a diene rubber;

an inorganic filler in an amount of 5 to 150 parts by mass per 100 parts by mass of the diene rubber; and the organosilicon compound in an amount of 0.5 to 15 parts by mass per 100 parts by mass of the inorganic filler.

3. The pneumatic tire according to claim 2, wherein the inorganic filler has a silica content of 90% by mass or more.

* * * * *